United States Patent Office 3,098,837
Patented July 23, 1963

3,098,837
LATEX MASTERBATCHING OF SILICA WITH VINYL PYRIDINE RUBBERS
Henry E. Haxo, Jr., Wayne, N.J., assignor to United States Rubber Company, New York, N.Y., a corporation of New Jersey
No Drawing. Filed Apr. 25, 1960, Ser. No. 24,218
1 Claim. (Cl. 260—41.5)

This invention relates to vinyl pyridine rubbers and more particularly to a method of compounding vinyl pyridine rubbers with reinforcing silica fillers.

It has long been considered desirable to incorporate silica fillers into rubber by means of a technique known as latex masterbatching. Ideally, such a technique involves the mixing of an aqueous dispersion of silica with a latex of the particular rubber to be employed with the coprecipitation thereafter of a homogeneous blend of rubber and silica. Such a direct technique has heretofore been very difficult because carefully controlled amounts of additional components have had to be added to the silica or the latex in order to assure efficient coprecipitation. Without such additional components, the dispersed silica is known to exhibit a tendency to remain in suspension during the coagulation step thereby causing precipitation of essentially pure rubber instead of a silica-rubber mixture.

An example of such prior procedure may be found in U.S. Patent No. 2,616,860 to Leukhardt et al. wherein the patentees require the use of certain polyethylene polyamines plus glue in order to insure an efficient yield of rubber and silica together. It has been generally found that the Leukhardt et al. method is successful only when a fatty acid soap is used as the emulsifying agent for the latex. When a rosin acid soap is used as the emulsifying agent, the method of Leukhardt et al., is not very successful and special treatments are required in order to coprecipitate the rubber and silica. As is well known, fatty acids deteriorate fairly rapidly and successful emulsion polymerizations are not achieved unless freshly made fatty acids are employed. Accordingly the trend is toward greater utilization of the rosin acid soaps wherever practicable.

It has also been found through experimentation that, unless the particular latex composition disclosed by Leukhardt et al. at column 3, lines 13–26 is employed, there is a considerable loss of silica in the coprecipitation. In addition, it has been found that the method of Leukhardt et al. cannot generally be used to give silica concentrations in the final rubber product greater than about 30 to 40 parts of silica per 100 parts of rubber.

I have discovered that with vinyl pyridine rubbers I can do away with the use of such additives as polyethylene polyamine and glue and still obtain a homogeneous, vulcanizable product without losing any significant quantities of rubber or silica. Furthermore, I can obtain a satisfactory product whether the emulsifying agent employed is a rosin acid soap or a fatty acid soap. I do this by a careful control of pH at two significant stages of the reaction and by a careful control over the temperature of drying.

I have found that I can avoid the use of any additives if, before mixing my silica dispersion with my rubber latex, I make the silica dispersion alkaline by using a dilute alkali solution until the dispersion shows a pH in excess of 10 and preferably between 10 and 11. Unless this step is carried out, the normally acid silica will tend to remain in suspension and the rubber will tend to precipitate from the latex upon the mixing of the two materials.

The other stage of the process during which pH must be controlled is the coagulation stage. As is the conventional procedure, a coagulating agent must be used to cause the rubber and silica to coagulate. I have found that in order to achieve good results with vinyl pyridine rubbers, my coagulating solution must be at a pH of less than about 2.5. At pH values above about 2.5, the rubber will coagulate very slowly and will act in such a way as to prevent the dispersed silica from uniformly coagulating with the rubber. In addition, the amount of coagulating solution that must be present is quite critical. If there is too little coagulating solution present, even if at the correct pH, the effect of this invention will not be realized. Of course, if too much coagulating solution is present, the tendency of the silica to remain in suspension will be greatly increased. Generally, from about 5 to about 20 cc. of coagulating solution should be used for each gram of silica and rubber present in the mixture to be coagulated.

If the temperature of the coagulating solution is too low, the results of this invention cannot be readily accomplished since coagulation of the rubber would be too slow and filtration problems would exist. It is not advisable to exceed the boiling point of the coagulating solution which is usually a dilute aqueous solution of an acid or a salt. Thus the preferred temperature range for the coagulating solution is from about 70° C. to about 100° C. Although not as satisfactory as when higher temperatures are employed, fairly good results are obtainable with room temperature coagulation. Accordingly, within the broader purview of my invention the temperature of the coagulating solution can range from about 20° C. to about 100° C.

The vinyl pyridine rubbers to which my invention is applicable are copolymers containing a major proportion (i.e. more than 50% up to 96% by weight) of 1,3-butadiene and a minor proportion (correspondingly less than 50% down to 4% by weight) of a compound selected from the group consisting of unsubstituted monovinyl pyridines and alkyl substituted monovinyl pyridine. Examples of the latter are the three isomers of vinyl pyridine, namely the 2, 3, and 4-vinyl pyridines, 2-methyl-5-vinyl pyridine, 5-ethyl-2-vinyl pyridine, 2-ethyl-4-vinyl pyridine, etc. I prefer to use a copolymer made from a feed consisting of about 75 parts of 1,3-butadiene and about 25 parts of 2-methyl-5-vinyl pyridine; the resulting copolymer generally has a somewhat lower content of butadiene than the feed, typically analyzing from 20 up to 25% 2-methyl-5-vinyl pyridine, the balance being butadiene.

In order to be used in my invention, the copolymer should be in the form of a flowable latex containing from about 15% to about 60% by weight of solids. The latex is obtained by the emulsion copolymerization of butadiene and the vinylpyridine monomer in a conventional manner as typified by the method of U.S. Patent No. 2,402,020 to Cislak et al. As indicated by Cislak et al., a latex is formed upon the copolymerization in aqueous emulsion and it is this latex which should be used in my invention. It is generally preferable to strip off any unreacted monomers from this latex.

Both of the two most common types of rubber-reinforcing silicas are usable in my invention. This includes the so-called "vapor phase" silica as typified by "Aerosil" and "Cab-O-Sil" (for descriptions of the method of manufacture see Chem. and Eng. News, 31, 2074 (1953), and Ind. Eng. Chem., 51, 232 (1959)) and the precipitated hydrated silicas typified by "Hi-Sil" (for description of method of manufacture see Allen, Canadian Patent No. 574,031, issued April 14, 1959). The silica may be suspended in water without difficulty in accordance with conventional procedures or it may be obtained as an aqueous slurry from an intermediate stage in its manufacture. The aqueous dispersion must be flowable and should generally contain from about 5 to about 20% by weight of solids. As is well known, for good reinforcing effects, the average particle size of the silica should be fairly small and generally should be less than about 1 micron. In order to realize satisfactory reinforcing properties in the resultant rubber, there should be at least 10 parts by weight of silica per 100 parts of rubber present in the final product so that the amount of silica to be mixed with the latex is calculated on the basis of the amount of silica desired in the final product. Use of more than 100 parts by weight of silica per 100 parts of rubber is not very practical.

The preferred coagulating solutions are dilute aqueous solutions of hydrochloric acid or formic acid in a concentration ranging from an extremely low figure up to about 5% by weight.

The procedure of my invention involves adjusting the pH of the silica dispersion to a value of 10 or above and thereafter mixing this dispersion with the latex. This mixture is then charged into the coagulating solution which must have a pH of less than about 2.5 and which is maintained at a temperature below 100° C. and preferably at least 70° C. at which time the rubber and silica coagulate. The resultant slurry should then be filtered and dried. The drying must be at a temperature from about 40° C. to about 90° C. At temperatures much above 90° C., the material exhibits a tendency to gel thereby rendering extremely difficult if not impossible any subsequent compounding operations and making the product unsuitable for use in tires. At these low drying temperatures, fairly long drying times are often required. After the drying step, additional compounding ingredients may be added on a conventional rubber mill or in a Banbury mixer and the composition may then be shaped and vulcanized.

Although not absolutely essential, the stability of the dried product will be greatly enhanced if a small quantity of a suitable antioxidant is added to the mixture of the latex and the silica dispersion before coagulation is effected. If an antioxidant is not added at this stage, drying should take place in the absence of oxygen as, for example, under vacuum or in an inert atmosphere.

Further details on the method of my invention may be obtained from the following examples.

*Example I*

745 grams of an "Aerosil" dispersion ("Aerosil" is a vapor phase silica) containing 13.4% solids and having a pH of about 5.9 was adjusted to a pH of about 10–11 with a dilute aqueous solution of sodium hydroxide. This dispersion was then added to 1115 grams of a latex containing 22.4% of a 75:25 (feed ratio) copolymer of 1,3-butadiene and 2-methyl-5-vinyl pyridine and the resultant slurry was agitated vigorously.

A solution of 150 cc. of 90% formic acid in 7000 cc. of water was prepared and raised to and maintained at 70° C. The latex-silica slurry was added to the formic acid solution whereupon the solid material was caused to coagulate. The slurry was filtered under vacuum for 40 minutes and thereafter the filter cake was reslurried with 80° C. water and refiltered for 15 minutes. The filter cake was then dried for 3 days at 50° C. in a vacuum oven at which time the dried product was crumb-like and weighed 334 grams representing a 95% yield of materials. The dried crumb became transparent when sheeted on a mill.

The crumb was subsequently compounded on a conventional rubber mill in the following proportions:

| Ingredient— | Parts by weight |
|---|---|
| Dried crumb | 300 |
| Stearic acid | 4.3 |
| Zinc oxide | 6.4 |
| "Paraflux" (an oil base softening agent) | 8.6 |
| Sulfur | 4.3 |
| "Monex" (tetramethylthiuram monosulfide) | 1.5 | and thereafter shaped and vulcanized for 90 minutes at 45 p.s.i. steam pressure. The resultant product was elastomeric and exhibited a tensile strength of 2570 p.s.i., a Shore Durometer hardness index of 66 and an elongation at break of 290%.

*Example II*

4080 grams of an aqueous suspension of a precipitated hydrated silica ("Hi-Sil X-303") containing 7.8% solids were adjusted with a 2% sodium hydroxide solution to a pH of 10–11. This suspension was then added to 2710 grams of a latex containing 22.2% of a 75:25 (feed ratio) copolymer of 1,3-butadiene and 2-methyl-5-vinyl pyridine and the resultant slurry was agitated vigorously. To this slurry, 60 grams of a 10% "Deenax" emulsion were added as an antioxidant ("Deenax" is an alkyl phenol derivative). The slurry was then charged into a solution of 200 cc. of 90% formic acid in 2 gallons of water at 70° C. whereby coagulation was caused to occur.

The slurry was filtered under vacuum, reslurried, refiltered and then dried for three days at 50° C. under vacuum with a resultant yield of 921 grams which represented a yield of 100%. The dried crumb became translucent when sheeted on a mill.

A vulcanizate exhibiting excellent physical properties was prepared by heating for 45 minutes at 45 p.s.i. steam after compounding as follows:

| Ingredient— | Parts by weight |
|---|---|
| Dried crumb | 153 |
| "Paraflux" | 5 |
| Stearic acid | 3 |
| Zinc oxide | 3 |
| "Monex" | 0.5 |
| Sulfur | 1.2 |

The physicals for the vulcanizate were: tensile, 3450 p.s.i.; 300% modulus, 850 p.s.i.; elongation at break, 720%.

*Example III*

25 cc. of an aqueous dispersion of "Ludox" (a precipitated silica in colloidal dispersion having an average particle size of 10–20 millimicrons, believed to have been made by removing sodium ions from sodium silicate solution by means of a cationic exchange resin) containing 30% solids was adjusted to a pH of about 10 and was then added to 50 cc. of a latex containing 22.4% of a 75:25 (feed) copolymer of 1,3-butadiene and 2-methyl-5-vinyl pyridine and agitated. This slurry was then charged to a dilute hydrochloric acid solution having a pH of about 1.0 and containing 25 cc. of concentrated hydrochloric acid in 500 cc. of water whereupon flocculation of the solid particles took place. The slurry was filtered under vacuum and then dried under vacuum at 80° C. for about 24 hours. The dried product was observed to be a tough and hard crumb which was capable of being further compounded on a mill.

The product of my invention can be used for any of the purposes for which reinforced rubber is commonly used, such as in rubber footwear, hose, tires, etc. It is especially suitable for use in making white or light-colored rubber articles such as rubber footwear or the white sidewalls of tires.

Having thus described my invention, what I claim and desire to protect by Letters Patent is:

The process of preparing a silica-filled vinyl pyridine rubber stock comprising: mixing a latex of a copolymer of a monomer mixture consisting of about 75% by weight of 1,3-butadiene and 25% by weight of 2-methyl-5-vinyl pyridine said latex being flowable and containing from about 15 to about 60% by weight of said copolymer, with a water dispersion of a particulate rubber-reinforcing silica having an average particle size of less than about 1 micron, said dispersion being flowable, containing from about 5% to about 20% by weight of suspended solids and having a pH of from about 10 to about 11, in relative proportions such that there are present from 10 to 100 parts by weight of silica per 100 parts of said copolymer; adding the latex-dispersion mixture to an aqueous coagulating solution having a pH of less than about 2.5 and containing up to 5% by weight of a compound selected from the class consisting of hydrochloric acid and formic acid, said coagulating solution being at a temperature of from about 70° C. to about 100° C. and being employed in an amount from about 5 to 20 cc. of solution per gram of solid silica contained in the system, whereby the solid materials in the system are caused to coagulate; filtering the mixture and thereafter drying the solid material at a temperature of from about 40° C. to about 90° C.; whereby a crumb-like material is obtained which can be further compounded with sulfur and other additives and vulcanized in accordance with conventional rubber compounding and vulcanizing procedures.

References Cited in the file of this patent
UNITED STATES PATENTS

| | | |
|---|---|---|
| 2,885,381 | Svetlik | May 5, 1959 |
| 2,964,490 | Howland et al. | Dec. 13, 1960 |